United States Patent [19]

Khoylian et al.

[11] 4,324,326

[45] Apr. 13, 1982

[54] DISCHARGE ASSEMBLY FOR AN OVEN

[75] Inventors: Rouzas R. Khoylian, Belmont, Mass.; James R. Cowdery, Pellham, N.H.; David B. Park, Wilmington, Mass.

[73] Assignee: Design + Process Engineering Inc., Billercia, Mass.

[21] Appl. No.: 122,247

[22] Filed: Feb. 19, 1980

[51] Int. Cl.³ .................... B65G 47/31; B65G 47/84
[52] U.S. Cl. .................................. 198/461; 198/472; 198/484; 198/487; 198/576; 198/578
[58] Field of Search ............. 198/461, 472, 575, 576, 198/578, 579, 484, 487; 414/152, 157, 211

[56] References Cited

U.S. PATENT DOCUMENTS

| Re. 17,517 | 12/1929 | Olson | 198/597 |
|---|---|---|---|
| 3,721,330 | 3/1973 | Crawford | 198/461 |
| 3,870,169 | 3/1975 | Kojima | 198/575 X |
| 3,993,189 | 11/1976 | Khoylian | 198/465 |
| 4,166,525 | 9/1979 | Bruno | 198/575 X |
| 4,232,779 | 11/1980 | Khoylian | 198/482 X |

Primary Examiner—James L. Rowland
Attorney, Agent, or Firm—Kenyon & Kenyon

[57] ABSTRACT

The discharge assembly includes a pivotally mounted transfer conveyor to receive a flexible carrier from a descending process elevator and a discharge conveyor for discharging the items on the carrier onto a take-off conveyor. The diameter of the nose roller of the discharge conveyor is made relatively small so as to reduce the gap to the take-off conveyor.

14 Claims, 4 Drawing Figures

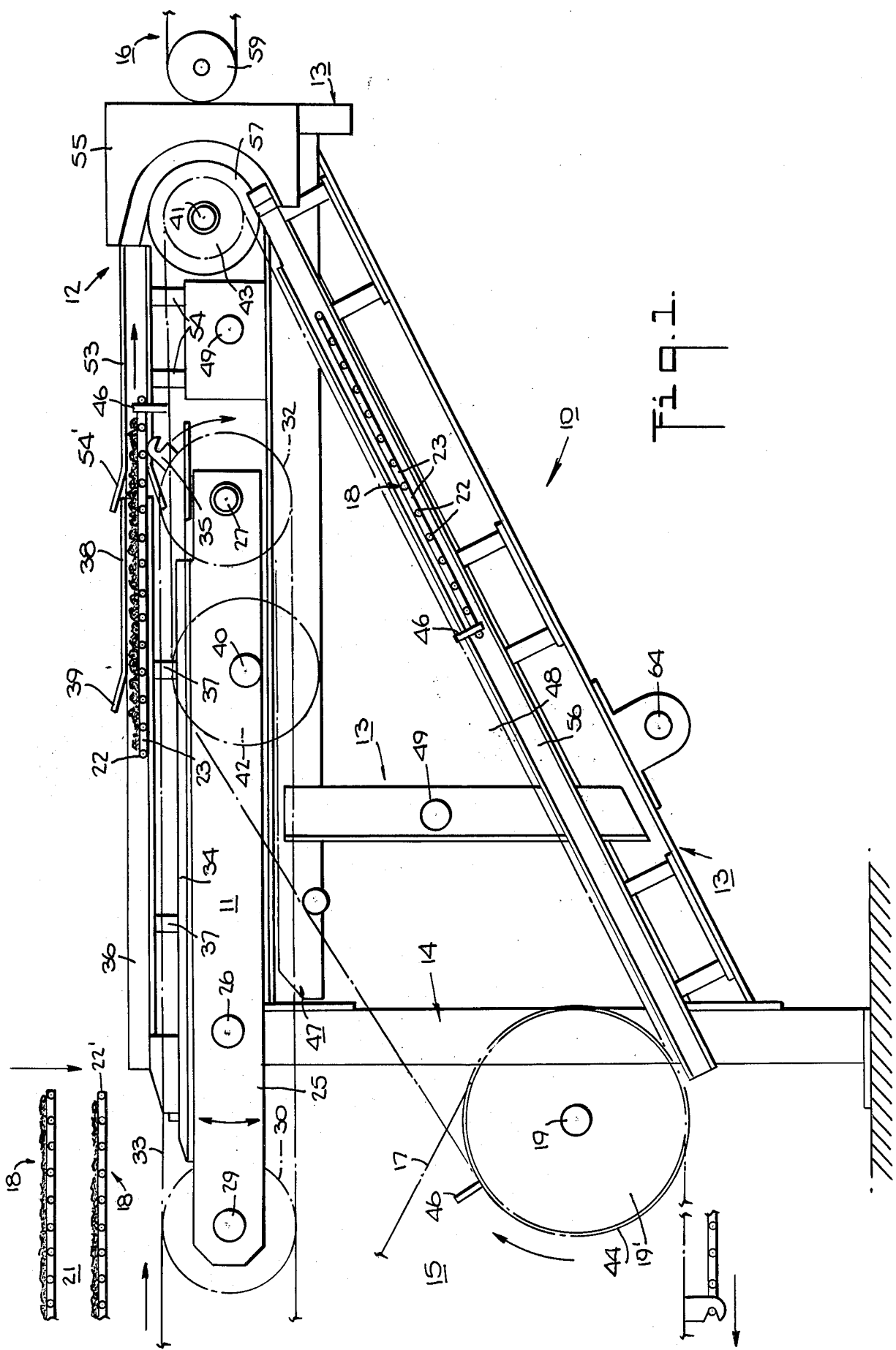

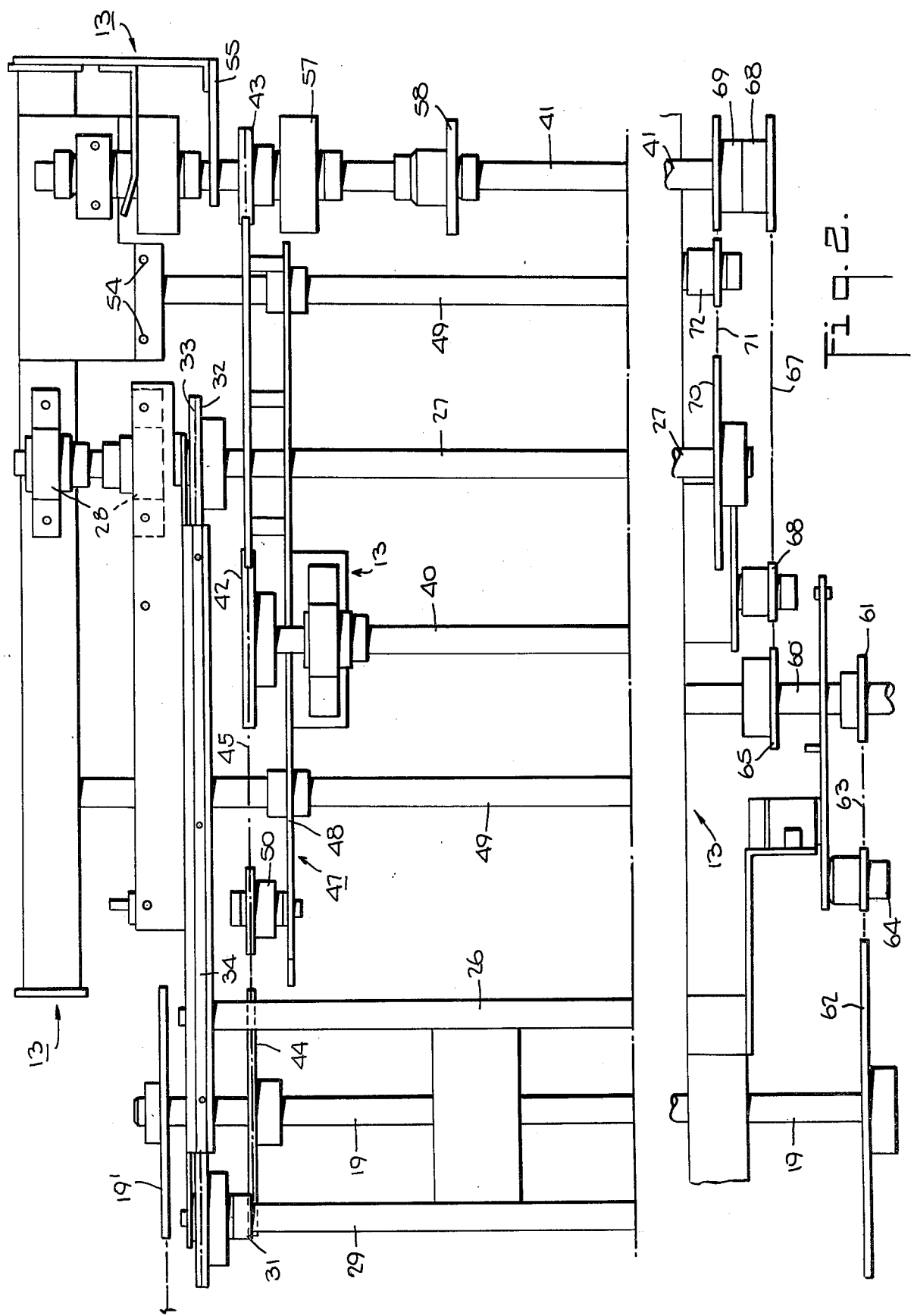

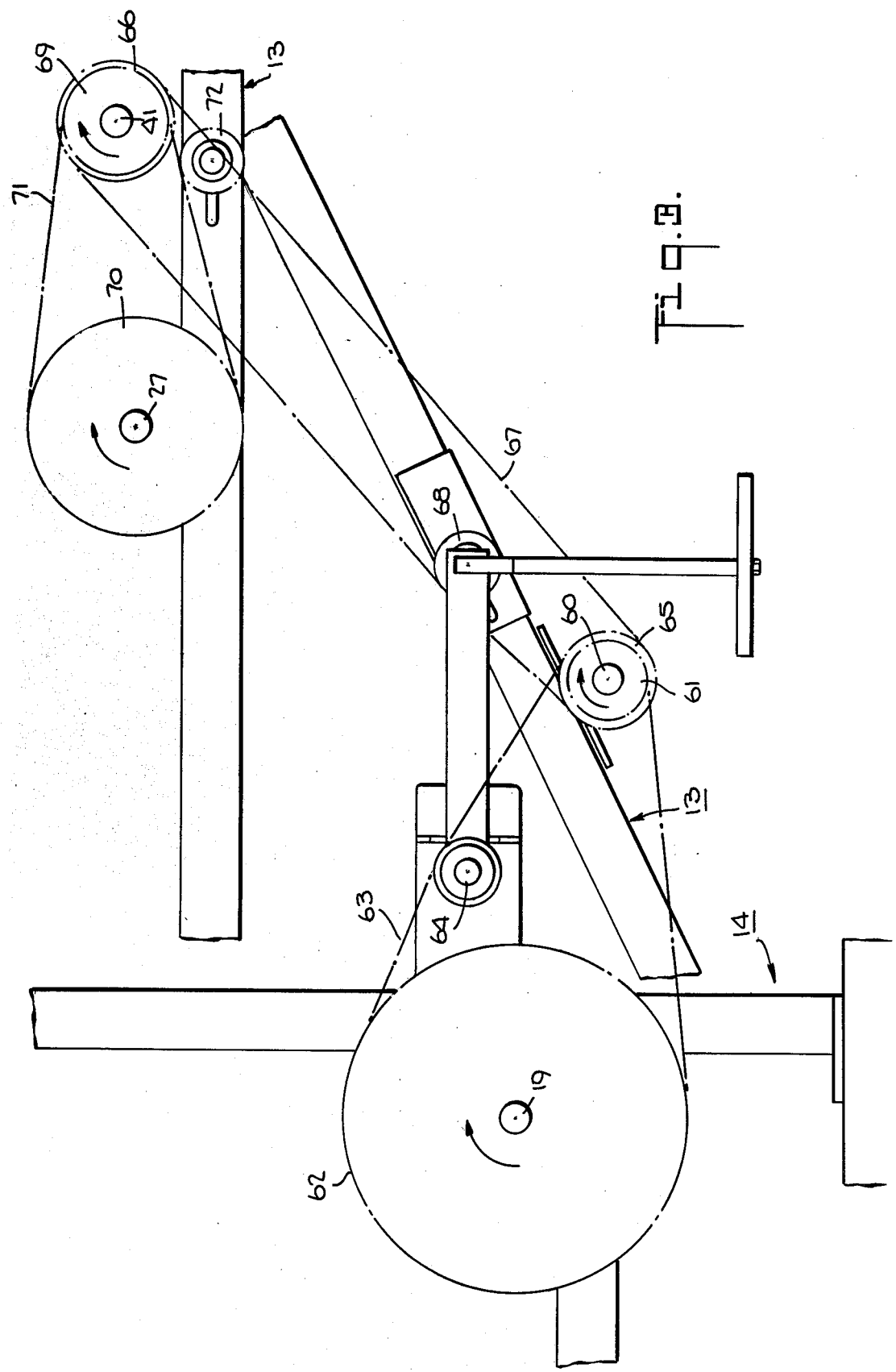

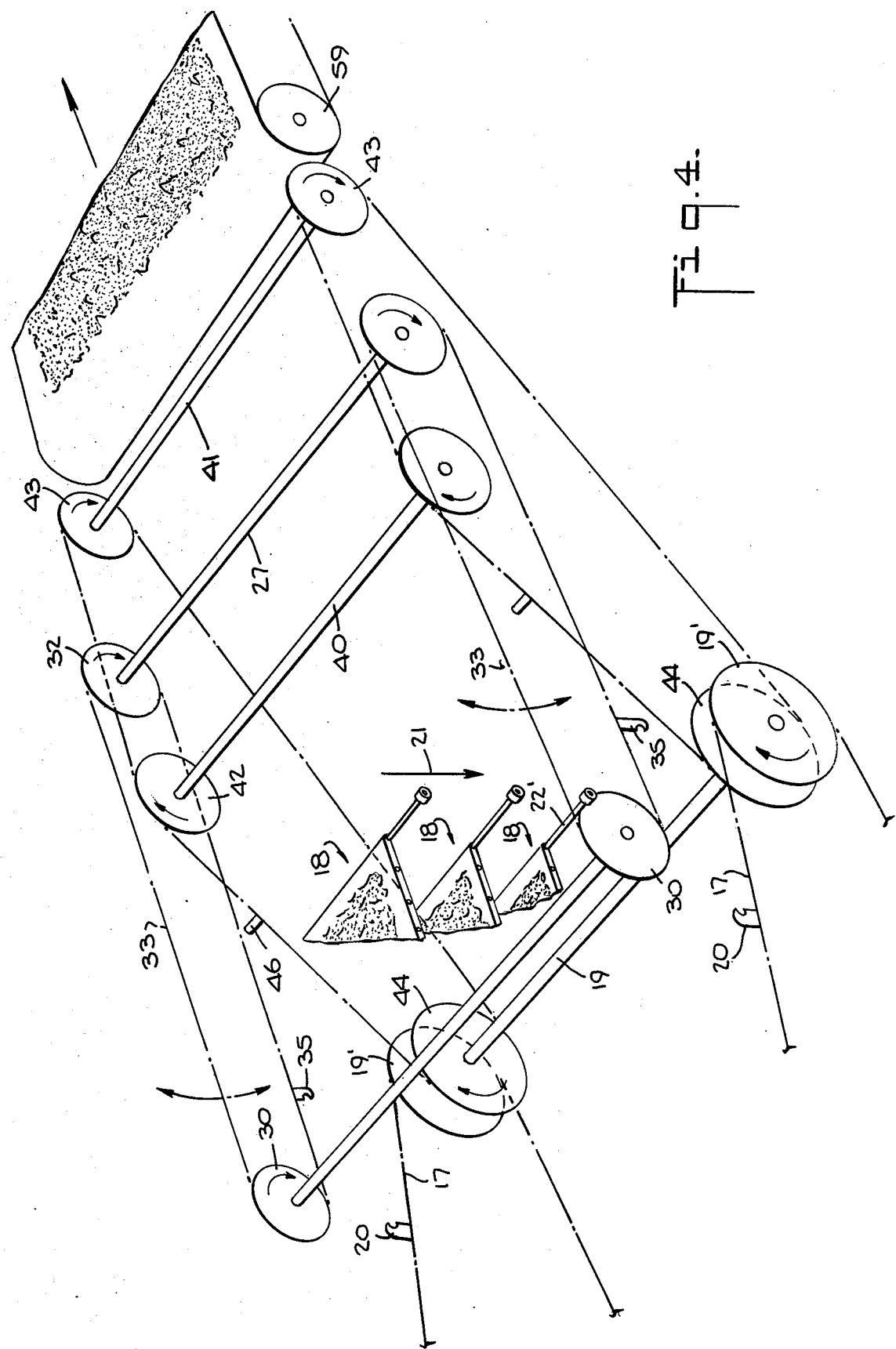

DISCHARGE ASSEMBLY FOR AN OVEN

This invention relates to a discharge assembly for an oven and more particularly to a continuous operable discharge assembly for a conveyor type oven.

Heretofore, it has been known to process items such as food items by conveying the same through various processing stations. In some cases, the items being processed are conveyed on individual carriers or mats through the processing stations. In addition, it has been known to construct a processing station, such as an oven, in a vertical manner and to employ elevators therein, for example as described in U.S. Pat. No. 3,993,189 to raise and lower the carriers. In such cases, after the product items on the carriers have been processed, each carrier is pulled out of the oven by means of the same processing conveyor by which the carriers are introduced into the oven.

Generally, the processing conveyor constitutes one or more chains in which hooks are mounted to engage the forward end of a carrier. These chains, in turn, are disposed in an endless loop and are cycled over relatively large diameter rollers. As a consequence, if the product items are to be deposited onto other conveyors, such as a take-off conveyor, for subsequent processing, a relatively large gap may occur between the processing conveyor and the take-off conveyor. Specifically, since both of these conveyors have large diameter rollers over which a conveyor chain or belt passes, the distance between the rollers in a tangental plane to the rollers is relatively large. Thus, in order to preclude items from dropping into the gap between the two rollers, it has been necessary to provide a ramp therebetween. In this way, the product items can slide down the ramp from the processing conveyor to the take-off conveyor. This, however, requires the use of an additional element which provides a stationary surface on which the sliding articles may stick, and thus, be a cause of jamming.

In a case where food items are being processed, use of a stationary ramp between the processing conveyor and the takeoff conveyor must conform with various hygenic standards. In addition, the ramp must be mounted so that cleaning can be easily carried out.

Further, because the ramp itself introduces gaps between the two conveyors, there is a possibility that particles of food may become entrapped under the ramp near these gaps. This, in turn, requires monitoring and cleaning.

Accordingly, it is an object of the invention to provide a simple discharge assembly for a vertical-stack oven.

It is another object of the invention to provide for an easy transfer of product items from a processing conveyor to a take off conveyor.

It is another object of the invention to avoid places where food particles may accumulate in a food processing conveyor system.

Briefly, the invention provides a discharge assembly for sequentially conveying a series of flexible product-carriers from a treatment station in which the carriers are vertically stacked to a discharge station.

The discharge assembly is comprised of a transfer conveyor having hook means for engaging a forward end of a lowermost carrier in the treatment station and an endless chain for moving the hook means in an endless path having an upper longitudinal run and a lower run. In addition, the discharge assembly has a discharge conveyor with at least one bar means for engaging the forward end of a carrier on the upper run of the transfer conveyor and an endless chain for moving the bar means in an endless path having a horizontal run disposed in overlapping relation with the upper run of the transfer conveyor and extending to the discharge station. Further, the discharge assembly has means for driving the discharge conveyor at a speed faster than the transfer conveyor to permit transfer of a carrier on the upper run of the transfer conveyor to the horizontal run of the discharge conveyor.

The treatment station includes a vertically disposed elevator for conveying a series of vertically stacked flexible carriers in a descending path. In this case, the transfer conveyor is disposed to have the hook means engage the forward end of the lowermost carrier on the elevator so that the carrier can be moved from the elevator onto and along the upper run of the conveyor.

In addition, a main conveyor of the processing installation is disposed below the elevator and adjacent to the discharge conveyor in order to recycle the carriers. To this end, the main conveyor has a hook means for engaging the forward end of a carrier and means for moving the hook means in an endless path having a section coincident with the endless path of the discharge conveyor between the downwardly directed run and a return run which extends from the downwardly directed run to the horizontal run.

A take-off conveyor is also disposed at the discharge station for receiving the product items which are disposed on the carriers. In this regard, the discharge conveyor has a roller for directing the bar means from the horizonal run to the downwardly directed run. This roller is of a small diameter and is disposed in opposition to a like-sized roller of the take-off conveyor. Because small diameter rollers can be used, the gap formed beteen the rollers can be relatively small so as to preclude dropping of any product items between the rollers.

The transfer conveyor of the discharge assembly is pivotally mounted at the end remote from the treatment station so that, the opposite end can pivot upwardly to engage a forwardmost end of a carrier in the elevator. The transfer conveyor is also synchronized to pivot downwardly with the descending elevator while a carrier is being transferred from the elevator onto the transfer conveyor.

The discharge conveyor has suitable guide tracks or ramps located at the pivot end of the transfer conveyor to accommodate the pivoting action of the transfer conveyor and serve to guide a carrier onto the discharge conveyor. Suitable guide means are also provided for guiding the carrier along the downwardly directed ramp of the discharge conveyor.

In operation, as a carrier is descending with the elevator, the transfer conveyor is pivoted upwardly via a suitable means such as a cam or other electrical/mechanical switch means so as to align with the lowermost carrier on the elevator. Thereafter, the hook means which may be one or more hooks on an endless chain, engages the forward end of the carrier and begins to pull the carrier from the elevator. During this time, the carrier rides along the guide tracks of the transfer conveyor.

Subsequently, the bar means on the discharge conveyor rides up and come into engagement with the forward end of the carrier while on the transfer conveyor. As the discharge conveyor operates at a slightly faster speed than the transfer conveyor, the bar means of the discharge conveyor pulls the forward end of the carrier away from the hook means of the transfer conveyor. After a suitable spacing has occurred, the hook means of the transfer conveyor can be directed into the return run of the transfer conveyor. The bar means on the discharge conveyor continues to move in a horizontal run until reaching the point of discharge. At that point, the product items on the carrier can be dumped by gravity onto the take-off conveyor while the bar means is directed into the downwardly directed run of the discharge conveyor.

Upon reaching a lowermost point of the downwardly directed run, the forwardmost end of the carrier is engaged by one or more hooks on the main conveyor of the processing installation. The main conveyor then carries the carrier back to an original point in the installation while the bar means is recycled via the return run of the discharge conveyor.

FIG. 1 illustrates a side view of a discharge assembly constructed in accordance with the invention;

FIG. 2 illustrates a part-plan view of the discharge assembly of FIG. 1;

FIG. 3 illustrates a schematic view of the drive for the discharge assembly of FIG. 1;

FIG. 4 illustrates a schematic view of the discharge assembly between an elevator and a take-off conveyor in accordance with the invention.

Referring to FIG. 1, the discharge assembly 10 is comprised of a transfer conveyor 11 and a discharge or pull-out conveyor 12 which are mounted in a common frame 13. As shown, the discharge assembly 10 is mounted via the frame 13 on a frame 14 of a vertical stack conveyor 15, and is disposed at a downstream end adjacent to a take-off conveyor 16 of a discharge station.

The vertical stack conveyor 15 forms part of a processing installation having an endless main conveyor formed, e.g. of one or more endless chains 17 which are disposed in an endless path so as to convey individual carriers or mats 18 through the installation. To this end, the processing installation has a shaft 19 with a pair of sprockets 19' at the downstream end, each of which is rotatably mounted in the frame 14 to mesh with a chain 17 in a driving relation. The main conveyor chain 17 carries a plurality of spaced apart hooks 20 which serve to engage the carriers 18 individually at a downstream point (not shown) in order to pull the carriers 18 into an elevator unit (not shown) for processing. The carriers 18 are subsequently conveyed onto a descending elevator 21 of the vertical stack conveyor 15 and moved in a descending path for subsequent transfer out of the installation 14. The main conveyor chain 17 is not required for this purpose and, as shown, is deployed below the elevator 21 so as not to interfere with the carriers 18 on the elevator 21.

The treatment station of the installation in which the elevator 21 is disposed is similarly described in U.S. Pat. No. 3,993,189, and, therefore, no further description is believed to be required.

Each carrier 18 is of a type as described in U.S. Pat. No. 3,993,189 and generally includes a plurality of elongated parallel rods 22 which are interconnected by links 23 so as to form a mesh-like surface to receive product items 24 thereon. Each carrier is, for example approximately, twenty (20) feet long at about six (6) feet wide. The forward end of each carrier 18 is provided with suitable openings to expose parts of the forwardmost rod 22' for engagement with the hooks 20 of the main conveyor chains 17.

The transfer conveyor 11 is pivotally mounted within the frame 13 of the discharge assembly 10 so that the end adjacent to the elevator 21 may be pivoted up and down. In this regard, the transfer conveyor 11 includes a pair of side walls 25 which are interconnected by various cross bars 26 and which are mounted on a pivot shaft 27 via suitable bearings (not shown) to pivot thereon. The pivot shaft 27 is, in turn, journalled in the frame 13 of the discharge assembly 10 via suitable bearings 28, such as pillow block bearings for rotation. The side walls 25 carry a shaft 29 at the free end on which a pair of sprockets 30 are fixedly mounted. The shaft 29 is rotatable within the side walls 25 via suitable bearings 31. The pivot shaft 27 likewise carries a pair of sprockets 32 which are aligned with the sprockets 30 at the free end. In addition, an endless chain 33 is disposed about each pair of aligned sprockets 30, 32 in endless fashion.

Each side wall 25 also carries a guide 34, for example of U-shaped cross-section, within which an upper run of a chain 33 is guided longitudinally between the sprockets 30, 32.

Each chain 33 carries a hook means 35, of suitable shape and dimension to engage with the foremost rod 22' of a lower most carrier 18 on the elevator 21 at a predetermined point within the conveyor 15.

The transfer conveyor 11 also has a pair of guide ramps or tracks 36 each of which is mounted on a respective side wall 25 so as to guide one side of a carrier 18 therein. As shown in FIG. 1, each ramp 36 is mounted on supports 37 in a raised manner above the plane of the chains 33. Each ramp 36 is of generally angle shape and carries a cover 38 along a rear portion relative to the direction of travel of a carrier 18 to retain an edge of a carrier 18 on the ramp 36. Each cover 38 has a flared front edge 39 to accomodate passage of the carrier 18.

The transfer conveyor 11 is pivotal about the pivot shaft 27 via suitable means (not shown) so as to be pivoted upwardy as viewed in FIG. 1 to a point to coincide with a ramp (not shown) on the elevator 21 on which the lowermost carrier is disposed. After being aligned with the elevator ramp, the transfer conveyor 11 pivots downwardly with the ramp as the elevator 21 descends while the carrier 18 is removed via the hook means 35 on each chain 33.

The pull out or discharge conveyor 12 of the discharge assembly 10 is fixed relative to the pivotal transfer conveyor 11 and has a pair of shafts 40, 41 rotatably mounted within and across the frame 13 of the discharge assembly 10 with each shaft 40, 41 carrying a pair of sprockets 42, 43. In addition, the shaft 19 on which the sprockets 19' of the main conveyor are mounted also carries a pair of sprockets 44 in alignment with the respective sprockets 42, 43. Also, a chain 45 is disposed about each aligned set of three sprockets 42, 43 so as to run in an endless path having a horizontal run which coincides for some distance with the upper run of the transfer conveyor 11, a downwardly directed run extending from the horizontal run and a return run extending between the downwardly directed run and the horizontal run. Each chain 45 carries a bar means 46 in the form of an upstanding bar of rectangular shape with smooth surfaces for movement through an endless path in an outwardly extending manner.

Each side of the discharge conveyor 12 is also provided with a chain support 47 for the respective chains 45. Each support 47 includes a flat shaped plate 48 which is mounted on a pair of transverse cross-beams 49 of the frame 13. Each plate 48 carries a tensioning sprocket 50 in an adjustable manner so as to permit an adjustment in the tension of a chain 45. In addition, each plate 48 carries a guide 51 via brackets 52 for guiding the horizontal run of a chain 45 and a similar guide (not shown) for the downwardly directed run of the respective chain 45.

Referring to FIG. 1, each side of the discharge conveyor 12 is also provided with a guide ramp 53 to receive and guide the ends of the rods 22 of a carrier 18. Each guide ramp 53 is mounted on a pair of supports 54 which are fixed to the frame 13. As shown, each guide ramp 53 has a flared receiving end 54' so as to accommodate the pivoting motion of the guide ramps 38 of the transfer conveyor 11.

In addition, the discharge conveyor 12 has a pair of guide plates 55 each of which is fixed to the frame 13 and disposed adjacent to a sprocket 43 to aid in guiding a carrier 18 about the sprockets 43 into the downwardly directed run of the chains 45. Likewise, a guide means 56 (FIG. 1) in the form of a guide ramp is fixed to the frame 13 and is disposed along the downwardly run of each chain 45 to guide the lateral ends of the carrier rods 22 therein. Each guide ramp 56 extends substantially from a point adjacent the plane of the sprocket 43 to a point adjacent the plane of the sprocket 44.

The shaft 41 of the discharge conveyor 12 carries a pair of rollers 57 and suitable roller-like guides 58 to function as a "nose roller" about which a carrier 18 is directed to move from a horizontal path to a downwardly directed path. The rollers 57 and guides 58 rotate with the shaft 41 and are of a larger diameter than the sprockets 43 driving the chains 45. This is to accomodate the path of the carriers 18.

The take-off conveyor 16 is positioned adjacent to the nose roller 57 of the discharge conveyor 12. As shown in FIG. 1, the take-off conveyor 16 includes a roller 59 or the like over which an endless belt or the like is disposed for receiving product items 24 which are discharged from a carrier 18. The take-off roller 59 is disposed coaxially of and adjacent to the nose roller 57 such that there is a relatively small gap therebetween.

Referring to FIGS. 2 and 3, the drive for the discharge assembly 10 is such that the speeds of the transfer conveyor 11 and discharge conveyor 12 are synchronized to the main conveyor with the positions of the hook means 35 and bar means 46 likewise synchronized to the position of the hooks 20 and carrier 18 position in the elevator. As shown, the drive has a main shaft 60 which carries a sprocket 61 which drives a gear 62 fixed to the shaft 19 which drives the main chain 17 via an endless chain 63. A suitable tensioning sprocket 64 is mounted on the frame 13 to adjust the tension in the chain 63. The main shaft 60 also carries a second sprocket 65 which drives a gear or sprocket 66 fixed to the shaft 41 of the discharge conveyor 12 via a chain 67. A suitable tensioning sprocket 68 is also mounted on the frame 13 in order to adjust the tension in the chain 67. The discharge conveyor shaft 41 carries a second sprocket or gear 69 which is fixed to the shaft 41 e.g. by a key to drive a sprocket 70 fixed to the pivot shaft 27 of the transfer conveyor 11 via a chain 71. A tensioning sprocket 72 is also mounted on the frame 13 to permit adjustment of the tension in the chain 71. The shaft 27, in turn, drives the chain 33.

By suitably sizing the sprockets 66, 69 and/or the numbers of gear teeth, the speed of the transfer conveyor 11 and discharge conveyor 12 can be readily synchronized with respect to each other and to the speed of the processing installation (i.e. to the main conveyor chain 17). To this end, the speed of the chain 33 of the transfer conveyor 11 may be 1.04 times the speed of the main conveyor chain 17 while the speed of the chain 45 of the discharge conveyor 12 is 1.15 times the speed of the main conveyor chain 17.

A suitable cam operated means (not shown) is provided in order to pivot the transfer conveyor 11 upwardly (i.e. clockwise as viewed in FIG. 1) so as to be aligned and synchronized with the descending motion of the lowermost set of tracks (not shown) carrying a carrier 18. A further description of this cam operated means which can be operated off the main drive of the installation is not believed to be necessary to an understanding of the invention.

In operation, with the processing installation conveying a sequence of carriers 28 therethrough, for example as described in U.S. Pat. No. 3,993,189, the carriers 18 are moved individually onto the tracks (not shown) of the descending elevator 21 of the installation. At the lowermost carrier on the elevator 21 moves into a predetermined position, the transfer conveyor 11 is caused to pivot upwardly, as viewed, so as to align with the carrier 18. At the same time, the hook means 35 on each chain 33 of the transfer conveyor 11 is moved into engagement with the forward end of the carrier 18 within the openings (see FIG. 4). Thereafter, the transfer conveyor 11 pivots downwardly, with the descending elevator 21 while the conveyor chains 33 pull the carrier 18 from the elevator 21 via the hooks 35 onto the guide ramps 36 of the transfer conveyor 11.

After the carrier 18 has been pulled along the guide ramps 36, the bar means 46 on the discharge conveyor 12 move into engagement with the forward end of the carrier 18. Initially, the bar means 46 of the discharge conveyor 12 and the hook means 35 of the transfer conveyor 11 both engage the forward end of the carrier 18. However, since the discharge conveyor 12 operates at a higher speed, the bar means 46 slowly move the carrier 18 away from the hook means 35 within the horizontal run of the chains 45. After a short distance, the hook means 35 are completely disengaged from the carrier 18 and, at this point (see FIG. 1), may be directed downwardly by being returned to the lower run of the transfer conveyor 11. The bar means 46, however, continue pulling the carrier 18 onto the guide ramps 53 of the discharge conveyor 12.

Continued movement of the bar means 46 causes the carrier 18 to reach and deflect the nose roller 57. At this time, the product items on the carrier 18 began to drop off onto the take-off conveyor 16 under gravity.

As the carrier 18 is emptied, the carrier 18 continues about the nose roller 57 and is directed downwardly along the guide ramps 56 through the downwardly directed runs of the discharge chains 45. When the forward-most end of the carrier 18 reaches the bottom of the guide ramps 56, the hook 20 on each main conveyor chain 17 comes into engagement with the forward end. At the same time, the lateral sides of the carrier 18 are brought into suitable guides of the installation. Thereafter, the bar means 46, being of smooth rectangular shape, begin to slide away from the carrier 18 and are returned along the upwardly directed runs to engage with a subsequent carrier.

It is to be noted that the bar means 46 of the discharge conveyor may drop off from the carrier prior to engagement of the hooks 20 of the main conveyor chain 17 with the carrier 18. This is permissible since the bar means 46 have smooth surfaces which easily slide off the carrier rod 22'. The carrier 18 thus may be brought to a stop immediately prior to being engaged by a hook 20 of the main conveyor chain 17.

It is be noted that the diameter of the nose roller 47, i.e. the rollers 57 and guides 58 on the shaft 41, are of relatively small dimension relative to the diameters of the sprockets 32, 19' of the transfer conveyor 11 and main conveyor. Thus, rather than discharging the items from about a large diameter "nose roller" conforming to the size of the sprockets 19', the discharge can take place from a "nose roller", of much smaller diameter. Further, by using a smaller diameter "nose roller", the roller 59 of the take-off conveyor 16 may also be made smaller. As a result, the gap between the nose roller 57 and roller 59 can be made relatively small. This, in turn, reduces the risk of the product items falling into the gap especially since the items are dumped inertially towards and onto the take-off conveyor 16. For example, the "nose roller" may have a diameter of 4⅜ inches, the roller 59 may have a diameter of one inch and the gap therebetween may be one-half inch from the surface of the carrier to the nearest surface of the take-off conveyor 16.

The invention thus provides a discharge assembly which can be readily mounted on the frame of a vertical stack processing installation and which can discharge product items onto a take-off conveyor in an efficient manner.

What is claimed is:

1. In combination
a vertically disposed elevator for conveying a series of flexible carriers in a descending path;
a transfer conveyor having hook means for engaging a forward end of a carrier on said elevator and means for moving said hook means in an endless path having an upper longitudinal run and a lower run;
a discharge conveyor having a bar means for engaging the forward end of a carrier on said transfer conveyor, means for moving said bar means in an endless path having a horizontal run, a downwardly directed run extending from said horizontal run and a return run extending between said downwardly directed run and said horizontal run; said horizontal run being disposed in overlapping relation with said upper run of said transfer conveyor to permit transfer of a carrier on said transfer conveyor to said horizontal run of said discharge conveyor; and
a main conveyor having second hook means for engaging the forward end of a carrier and means for moving said second hook means in an endless path having a section coincident with said endless path of said discharge conveyor between said downwardly directed run and said return run.

2. The combination as set forth in claim 1 wherein said discharge conveyor includes a pair of parallel guide ramps for receiving a carrier, said ramps being parallel to said horizontal run to guide a carrier along said horizontal run.

3. The combination as set forth in claim 2 wherein said transfer conveyor has a large diameter roller for directing said first hook means from said upper run to said lower run and said discharge conveyor has a small diameter roller for directing said bar means from said horizontal run to said downwardly directed run.

4. The combination as set forth in claim 1 wherein said transfer conveyor is pivotally mounted at an end remote from said elevator to pivot downwardly in synchronism with the descent of said elevator.

5. The combination as set forth in claim 1 which further comprises means for driving said discharge conveyor at a faster speed than said transfer conveyor to permit said bar means to engage and move a carrier engaged by said hook means of said transfer conveyor from said hook means.

6. The combination as set forth in claim 1 wherein said discharge conveyor includes guide means for guiding a carrier along said horizontal run and said downwardly directed run.

7. A discharge assembly for sequentially conveying a series of flexible product-carrying carriers from a treatment station in which the carriers are vertically stacked to a discharge station; said discharge assembly comprising
a transfer conveyor having hook means for engaging a forward end of a lowermost carrier, and an endless chain for moving said hook means in an endless path having an upper longitudinal run and a lower run;
a discharge conveyor having at least one bar means for engaging the forward end of a carrier on said upper run of said transfer conveyor and an endless chain for moving said bar means in an endless path having a horizontal run disposed in overlapping relation with said upper run of said transfer conveyor and extending to said discharge station; and
means for driving said discharge conveyor at a speed faster than said transfer conveyor to permit transfer of a carrier on said upper run of said transfer conveyor to said horizontal run of said discharge conveyor.

8. A discharge assembly as set forth in claim 7 wherein said discharge conveyor further has guide means for laterally guiding a carrier there along.

9. A discharge assembly as set forth in claim 8 wherein said endless path of said discharge conveyor further has a downwardly directed run extending from said horizontal run at said discharge station and a return run extending between said downwardly directed run to said horizontal run.

10. A discharge assembly as set forth in claim 9 wherein said guide means includes a guide block at said discharge station for guiding a carrier into said downwardly directed run.

11. A discharge assembly as set forth in claim 8 wherein said transfer conveyor has guide means for laterally guiding a carrier therealong.

12. A discharge assembly as set forth in claim 7 which further comprises a frame having said discharge conveyor mounted thereon and said transfer conveyor pivotally mounted thereon.

13. A discharge assembly as set forth in claim 12 wherein said transfer conveyor has a pair of parallel guide ramps for guiding a carrier therebetween and said discharge conveyor has a pair of parallel guide ramps for receiving and guiding a carrier from said guide ramps of said transfer conveyor.

14. In combination,
a vertically disposed elevator at a treatment station for conveying a series of flexible product-carrying carriers in a descending vertical path;

a take-off conveyor at a discharge station for receiving the product on the carriers; and a discharge assembly for sequentially conveying the carriers from said elevator to said discharge station, said assembly including a pivotally mounted transfer conveyor having first means for engaging a forward run of a lowermost carrier on said elevator and an endless chain for moving said means in an endless path having an upper longitudinal run, a discharge conveyor having bar means for engaging the forward end of a carrier on said longitudinal run of said transfer conveyor and an endless chain for moving said bar means in an endless path having a horizontal run disposed in overlapping relation with said run of said transfer conveyor and extending to said discharge station, said second endless path having a downwardly directed run extending from said horizontal run and said discharge station to permit depositing of a product on a carrier onto said take-off conveyor, and means for driving said discharge conveyor at a speed faster than said transfer conveyor to permit transfer of a carrier on said upper run of said transfer conveyor to said horizontal run of said discharge conveyor.

* * * * *